United States Patent
Thompson

(10) Patent No.: US 10,139,227 B2
(45) Date of Patent: Nov. 27, 2018

(54) MEMS CIRCUIT FOR CAPACITIVE NON-LINEAR CORRECTION

(71) Applicant: InvenSense, Inc., San Jose, CA (US)

(72) Inventor: Matthew Thompson, Beaverton, OR (US)

(73) Assignee: InvenSense, Inc., San Jose, CA (US)

( * ) Notice: Subject to any disclaimer, the term of this patent is extended or adjusted under 35 U.S.C. 154(b) by 161 days.

(21) Appl. No.: 15/159,655

(22) Filed: May 19, 2016

(65) Prior Publication Data
US 2017/0336205 A1  Nov. 23, 2017

(51) Int. Cl.
  *G01P 15/125* (2006.01)
  *G01C 19/56* (2012.01)
  *G01C 19/5776* (2012.01)
  *G01P 15/12* (2006.01)

(52) U.S. Cl.
  CPC ......... *G01C 19/56* (2013.01); *G01C 19/5776* (2013.01); *G01P 15/123* (2013.01); *G01P 15/125* (2013.01)

(58) Field of Classification Search
  CPC .................................................. G01P 15/125
  USPC ....................................................... 73/514.32
  See application file for complete search history.

(56) References Cited

U.S. PATENT DOCUMENTS

| 4,584,885 | A | * | 4/1986 | Cadwell .............. G01P 15/131 324/109 |
| 6,230,566 | B1 | | 5/2001 | Lee et al. |
| 6,386,032 | B1 | | 5/2002 | Lemkin et al. |
| 2005/0145030 | A1 | * | 7/2005 | Elliott ................... G01P 15/125 73/514.18 |

FOREIGN PATENT DOCUMENTS

EP   1677073 A1   7/2006

OTHER PUBLICATIONS

PCT International Search Report and Written Opinion dated Aug. 9, 2017 in International Application No. PCT/US2017/031830. 15 pages.

* cited by examiner

*Primary Examiner* — John Chapman, Jr.

(57) ABSTRACT

A micro-electro-mechanical system includes a proof mass, an anchor, an amplifier, a sense element, a reference element, and a feedback element. The proof mass is configured to move in response to a stimulus. The anchor is coupled to the proof mass via a spring. The amplifier is configured to receive a proof mass signal from the proof mass via the spring and the anchor. The amplifier may be configured to amplify the received proof mass signal to generate an output signal. The sense element may be connected between the proof mass and a first input signal. The reference element may be connected between the anchor and a second input signal. The feedback element may be connected between the proof mass and the output signal. The feedback element and the sense element may change in response to proof mass displacement.

19 Claims, 6 Drawing Sheets

MEMS CIRCUIT FOR CAPACITIVE NON-LINEAR CORRECTION

BACKGROUND

Micro-electrical-mechanical (MEMS) sensors are commonly used in computer devices (including cellphones, tablets, fitness trackers, drones, etc.) to provide one or more environmental conditions to a processor, such as pressure information, acceleration information, rotation information and/or other suitable information. Current state-of-the-art MEMS sensors use variable capacitors as a transduction method between the electrical and mechanical domains of the MEMS sensor converting mechanical displacement into an electrical signal. However, variable capacitors are inherently non-linear and currently require up to 20 parameters of correction to generate the required linear output. It is therefore desirable to provide a capacitive transduction method that produces a linear output eliminating the need for the undesirable signal correction.

SUMMARY

Provided herein are various embodiments of a micro-electro-mechanical system (MEMS) including a sensor. In some embodiments, the MEMS includes a proof mass configured to move in response to a stimulus. An anchor is coupled to the proof mass via a spring. An amplifier is configured to receive a proof mass signal from the proof mass via the spring and the anchor. The amplifier is configured to amplify the received proof mass signal to generate an output signal. A sense element is connected between the proof mass and a first input signal. A reference element is connected between the anchor and a second input signal. A feedback element is connected between the proof mass and the output signal. The feedback element and the sense element change in response to the proof mass displacement.

In various embodiments, a method is disclosed. The method includes the step of generating a signal responsive to a proof mass displacement. The generated signal is amplified and applied back to the proof mass via a first varying element. A first input signal is applied to the proof mass via a second varying element and a second input signal is applied to the amplifier via a fixed element. A gain of the amplifier varies based on the proof mass displacement. It is appreciated that the gain of the amplifier changes dynamically and in response to the proof mass displacement.

In various embodiments, a device including a micro-electro-mechanical system (MEMS) device is disclosed. The MEMS device is configured to generate a first signal responsive to a stimulus. The first signal is generated in response to a displacement associated with a component within the MEMS device. A first capacitor and a second capacitor are configured to change their capacitance responsive to the displacement associated with the component within the MEMS device. The second capacitor is connected between a first input signal and the component within the MEMS device. A third capacitor is coupled between the MEMS device and a second input signal. An amplifier is configured to receive and amplify the first signal to generate an output signal. The first capacitor is connected between the output of the amplifier and the component within the MEMS device.

These and other features and aspects of the concepts described herein may be better understood with reference to the following drawings, description, and appended claims.

DESCRIPTION

Figure 1:
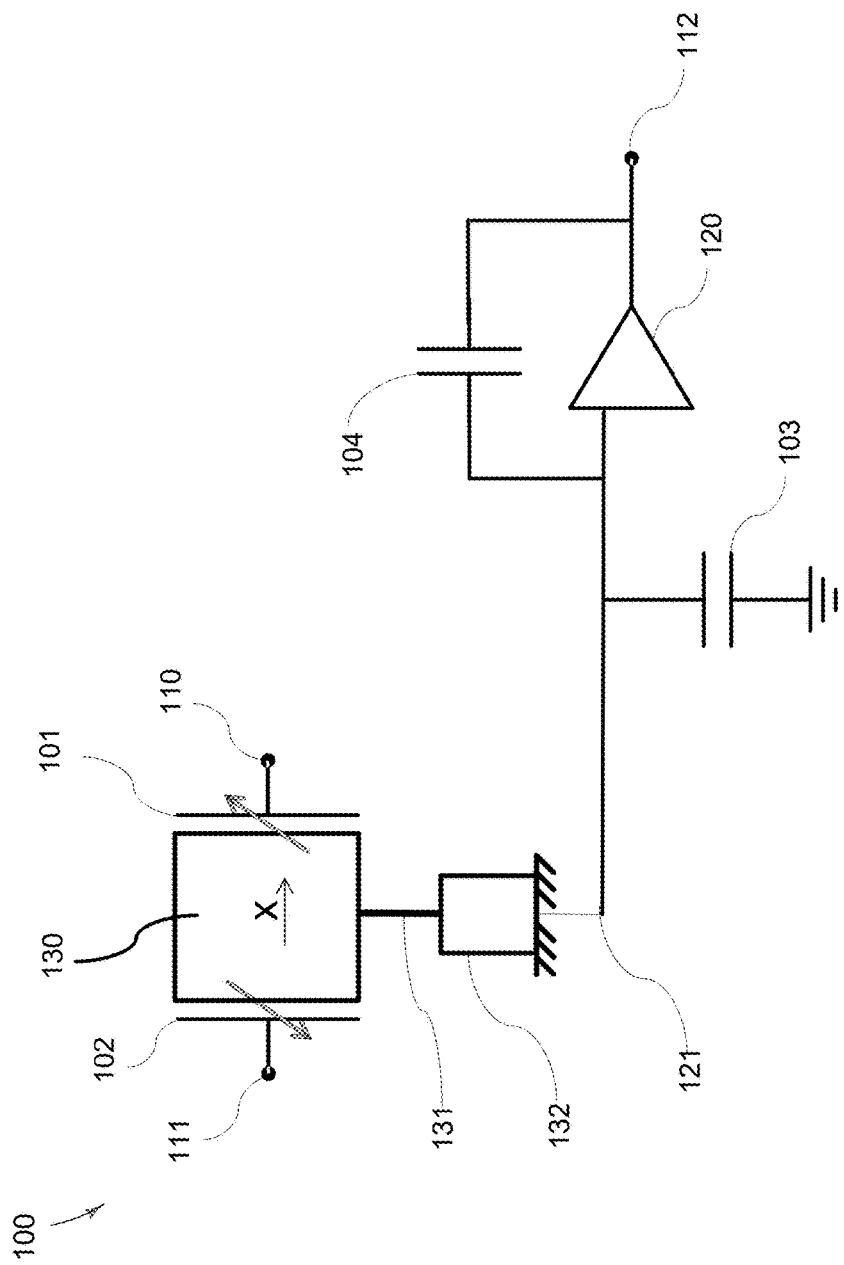
FIG. 1 shows a MEMS sensor with a first sense element and a second sense element, in accordance with some embodiments.

Before various embodiments are described in greater detail, it should be understood by persons having ordinary skill in the art that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood by persons having ordinary skill in the art that the terminology used herein is for the purpose of describing the certain concepts, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "forward," "reverse," "clockwise," "counter clockwise," "up," "down," or other similar terms such as "upper," "lower," "above," "below," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Unless defined otherwise, all technical and scientific terms used herein have the same meaning as commonly understood by persons of ordinary skill in the art to which the embodiments pertain.

In various embodiments, a micro-electric-mechanical system is disclosed. The system includes a proof mass coupled to an anchor via a spring. The proof mass is configured to move in response to one or more environmental stimuli. An amplifier receives a signal from the proof mass, for example, through a wire extending through the spring and the anchor. The signal is generated in response to the displacement of the proof mass. A sense element is connected between the proof mass and a first input signal and a feedback element is connected between the proof mass and an output signal of the amplifier. One or more electrical features of the proof mass and the sense element (such as capacitance, piezoelectric value, inductance, etc.) increase and/or decrease in response to displacement of the proof mass due to the environmental stimuli. A reference element can be connected between the anchor and a second input signal. The reference element provides the second signal to the amplifier via the anchor.

FIG. 1 illustrates one embodiment of a capacitive MEMS sensor 100. The capacitive MEMS sensor 100 is a micro-electro-mechanical system (MEMS) including a proof mass 130 located between a first sense element 101 and a second sense element 102. It is appreciated that the first sense element 101 and/or the second sense element 102 may be an electrode of a capacitor, a capacitor, a piezoelectric element, piezoresistive element, and/or any other suitable sense element. The proof mass 130 is configured to move between the first sense element 101 and the second sense element 102 in response to one or more external stimuli. For example, in various embodiments, the proof mass 130 is configured to move between the sense elements 101, 102 in response to acceleration, magnetic field, pressure, Coriolis force, acoustic pressure, piezoelectric force, electrostatic force, and/or any other suitable external stimuli or combination thereof. In the illustrated embodiment, the first sense element 101 and the second sense element 102 are arranged in a half-Wheatstone bridge configuration. In some embodiments, the proof mass 130 is coupled to an anchor 132 via a spring 131. The spring 131 maintains a connection between the proof mass 130 and the anchor 132 while allowing the proof mass 130 to move between the sense elements 101, 102.

The first sense element 101 is coupled to a first input 110 and the second sense element 102 is coupled to a second input 111. It will be appreciated that the first input 110 and/or the second input 111 may be a voltage input, a reference voltage, a variable voltage, and/or any other suitable input. The first input 110 and/or the second input 111 can comprise a positive input or a negative input. For example, in some embodiments, the first input 110 is coupled to a positive voltage such that the first sense element 101 defines a positive sense element and the second input 111 is a negative input such that the second sense element 102 defines a negative sense element, although it will be appreciated that other combinations of positive and/or negative sense elements is possible. In some embodiments, the second input 111 is an opposite of the first input 110. An opposite input is an input having the same magnitude (e.g., voltage) but opposite polarity. For example, in some embodiments, the first input 110 can be equal to a positive voltage $V_{in}$ and the second input 111 can be equal to an opposite, negative voltage $-V_{in}$. It is appreciated that in some embodiments, the magnitude of the first input 110 and the second input 111 may be different from one another. In some embodiments, the first sense element 101 and the second sense element 102 can comprise any suitable variable and/or fixed sense element, such as, for example, a capacitor, a piezoelectric element, piezoresistive element, a transistor, and/or any other suitable sense element.

Movement of the proof mass 130 between the first sense element 101 and the second sense element 102 changes one or more electrical properties of the sense elements 101, 102. For example, in some embodiments, movement of the proof mass 130 affects the capacitance of the first and second sense elements 101, 102. A capacitance of a positive sense element ($C_{101}$), for example in embodiments a first sense element 101 coupled to a positive first input 110, is defined by the equation:

$$C_{101} = \frac{\varepsilon_0 A}{g-x} = \frac{\varepsilon_0 A}{g}\left(1 + \frac{x}{g} + \frac{x^2}{g^2} + \frac{x^3}{g^3} + \ldots\right) \quad (1)$$

where g is the initial gap between the proof mass 130 and the first sense element 101, x is the displacement of the proof mass 130, A is the area of the first sense element 101, and $\varepsilon_0$ is permittivity of the space between the proof mass 130 and the first sense element 101. A capacitance of a negative sense element ($C_{102}$), for example, in embodiments a second sense element 102 coupled to a negative second input 111, is defined by the equation:

$$C_{102} = \frac{\varepsilon_0 A}{g+x} = \frac{\varepsilon_0 A}{g}\left(1 - \frac{x}{g} + \frac{x^2}{g^2} - \frac{x^3}{g^3} + \ldots\right) \quad (2)$$

where g is the initial gap between the proof mass 130 and the second sense element 102, x is the displacement of the proof mass 130, A is the area of the second sense element 102, and $\varepsilon_0$ is permittivity of the space between the proof mass 130 and the second sense element 102.

The proof mass 130 is electrically coupled to an amplifier 120. It will be appreciated that the amplifier 120 may be a current amplifier, voltage amplifier, transresistance amplifier, transconductance amplifier, and/or any suitable amplifier type. In some embodiments, the proof mass 130 is electrically coupled to an amplifier 120 by a wire 121. In the illustrated embodiment, the wire 121 extends through the spring 131 and the anchor 132, although it will be appreciated that the proof mass 130 can be coupled to the amplifier 120 by any suitable connection extending through any portion of the capacitive MEMS sensor 100. The wire 121 has a parasitic capacitance represented by capacitor 103. The amplifier 120 is configured to receive a proof mass signal from the proof mass 130. In some embodiments, the amplifier 120 includes a feedback capacitor 104.

The voltage of the output signal 112 is defined based on the difference in capacitance between the first capacitor 101 and the second capacitor 102. For example, in some embodiments, the voltage of the output signal 112 ($V_{112}$) is defined by the equation:

$$V_{112} = \frac{C_{101} - C_{102}}{C_{104}} V_{in} \quad (3)$$

where $C_{104}$ is the capacitance of the feedback capacitor 104. Combining this equation (3) with the equations (1 & 2) for capacitance of the first capacitor 101 ($C_{101}$) and the second capacitor 102 ($C_{102}$) discussed above gives:

$$V_{112} = \frac{1}{C_{104}} \frac{\varepsilon_0 A}{g}\left(\frac{2x}{g} + \frac{2x^3}{g^3} + \frac{2x^5}{g^5} \ldots\right) V_{in} \quad (4)$$

As shown in the above equation (4), the output voltage 112 is a function of the displacement, x. The output signal 112 of the capacitive MEMS sensor 100 is non-linear due to the presence of polynomial terms (such as the $x^3$, $x^5$, . . .

terms) in the equation. In some embodiments, one of the first sense element 101 or the second sense element 102 can be omitted to generate a linear output 112.

In a MEMS microphone sensor the non-linear terms distort the performance of the sensor at large sound levels. Total harmonic distortion is the measure of how the non-linear terms distort the signal. Reducing or removing the non-linear terms will improve the performance of the MEMS microphone at large sound levels.

Figure 2:
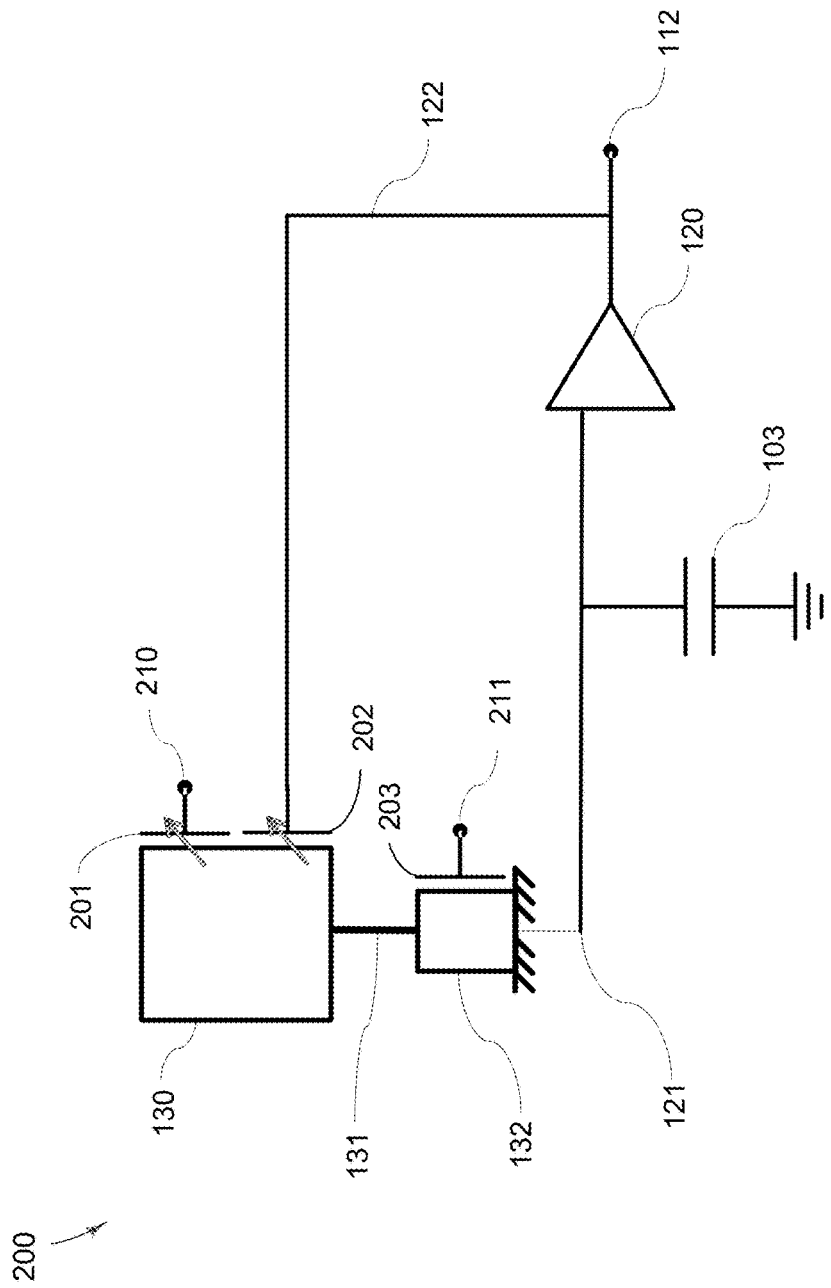
FIG. 2 shows a MEMS sensor with a sense element and a feedback element located on a first side of a proof mass, in accordance with some embodiments.

FIG. 2 illustrates one embodiment of a capacitive MEMS sensor 200 including a sense element 201 and a feedback element 202, both located on a first side of the proof mass 130. It will be appreciated that the sense element 201 and/or the feedback element 202 may be an electrode of a capacitor, a capacitor, a piezoelectric element, piezoresistive element, and/or any other suitable sense element. The first sense element 101 illustrated in FIG. 1 is effectively divided between the sense element 201 and the feedback element 202. The second sense element 102 is omitted. Displacement of the proof mass 130 changes one or more electrical parameters, such as capacitance, of both the sense element 201 and the feedback element 202 in unison. In some embodiments, the sense element 201 and the feedback element 202 are positioned such that the gap between the sense element 201 and the proof mass 130 is equal to the gap between the feedback element 202 and the proof mass 130 such that the one or more electrical parameters of the sense element 201 and the feedback element 202 change equally and in the same direction in response to displacement of the proof mass 130. For example, in some embodiments, the sense element 201 and the feedback element 202 are capacitive elements that equally increase and/or decrease capacitance in response the movement of the proof mass 130. In some embodiments, the sense element 201 and the feedback element 202 are capacitive elements that increase and/or decrease capacitance proportionally in response to the movement of the proof mass 130. The sense element 201 is coupled to a first input 210 and the feedback element 202 is coupled to an output 112 of the amplifier 120. It will be appreciated that the first input 210 may be a voltage input, a reference voltage, a variable voltage, and/or any other suitable input.

In some embodiments, the sense element 201 is coupled to a first input and the feedback element 202 is coupled to the output 112 of the amplifier 120. The sense element 201 and the feedback element 202 have a total capacitance defined by the equation:

$$C_0 = \frac{\varepsilon_0 A}{g} \quad (5)$$

where A is the total area of overlap of the sense element 201 and the proof mass 130 plus the total area of overlap of the feedback element 202 and the proof mass 130 (e.g., the area of overlap between the proof mass 130 and the first sense element 101 before the first sense element 101 is divided between the sense element 201 and the feedback element 202), g is initial (or zero) position gap between the sense element 201 and the feedback element 202 and the proof mass 130, and $\varepsilon_0$ is the permittivity of the space between proof mass 130 and the elements 201, 202. The total capacitance $C_0$ is split between the sense element 201 and the feedback element 202. In some embodiments, the sense element 201 and the feedback element 202 are physically separate elements each having an area defining a portion of the total capacitance $C_0$. In other embodiments, the sense element 201 and the feedback element 202 are portions of a single element. Movement of the proof mass 130 changes the capacitance of the sense element 201 and the feedback element 202. The capacitance of the sense element 201 ($C_{201}$) can be defined by the equation:

$$C_{201} = \frac{\alpha C_0}{1 - x/g} \quad (6)$$

where $\alpha$ is the percentage of the total capacitance $C_0$ of the sense element 201 and has a value $0 \leq \alpha \leq 1$ and x is the displacement of the proof mass 130. Similarly, the capacitance of the feedback element 202 ($C_{202}$) can be defined by the equation:

$$C_{202} = \frac{(1-\alpha)C_0}{1 - x/g} \quad (7)$$

The ratio of the total capacitance $C_0$ between the sense element 201 and the feedback element 202 can be any suitable ratio, such as, for example, 95/5, 90/10, 80/20, 70/30, and/or any other suitable ratio. In some embodiments, the ratio between the sense element 201 and the feedback element 202 determines the amplification of the amplifier 120. In embodiments omitting the feedback element 202, the gain of the amplifier is limited, as the signal-to-noise ratio of the amplifier 120 is increased.

In some embodiments, a reference element 203 is coupled between the anchor 132 and a second input 211. It will be appreciated that the second input 211 may be a voltage input, a reference voltage, a variable voltage, and/or any other suitable input. It will be further appreciated that the second reference element may be an electrode of a capacitor, a capacitor, a piezoelectric element, piezoresistive element, and/or any other suitable sense element. In some embodiments, the reference element 203 has a capacitance substantially equal to the total capacitance of the sense element 201 and the feedback element 202 when the proof mass 130 is in a zero, or non-displaced position. For example, the capacitance of the reference element 203 can be defined by the equation:

$$C_{203} = \alpha C_0 \quad (8)$$

In some embodiments, the second input 211 may be opposite to the first input 210, e.g., it may have a polarity opposite to that if the first input 210. The second input 211 is applied to the fixed anchor 132 by the reference element 203. In some embodiments, the second input 211 is applied to the amplifier 120 via the wire 121. As noted above, in some embodiments, an opposite input is an input having the same magnitude but with an opposite polarity, e.g., a first input of $+V_{in}$ and a second input of $-V_{in}$. It is appreciated that in some embodiments, an opposite input may have a polarity opposite to another input but it may have a different magnitude. As such, the description of the embodiments having opposite polarity and same magnitude is exemplary and should not be construed as limiting the scope of the embodiments. The sense element 201 and the reference element 203 may be arranged in a half-Wheatstone bridge configuration and provide an input to the amplifier 120.

Movement of the proof mass 130 in response to the external stimuli generates a proof mass signal that is provided to the amplifier 120 through the fixed anchor 132. The amplifier 120 generates an output signal 112 in response to the proof mass signal. In some embodiments, the amplifier 120 is a differential amplifier that generates an output 112 based on a difference between the proof mass signal and the second input 211. In other embodiments, the proof mass signal and the second input 211 are combined into a single signal at the anchor 132 and a single input signal is provided to the amplifier 120 via the wire 121. In some embodiments, the proof mass signal and the gain of the amplifier 120 may both be non-linear. The non-linearity of the proof mass signal and the non-linear gain of the amplifier 120 are adjusted such that the non-linearity's cancel out with one and another and generate a linear output signal 112 from the amplifier 120. For example, in some embodiments having the first input 210 equal to a voltage $+V_{in}$ and the second input 211 equal to a voltage of $-V_{in}$, the output 112 ($V_{112}$) of the amplifier 120 is defined by the equation:

$$\frac{V_{112}}{V_{in}} = \frac{\alpha C_0 - \frac{\alpha C_0}{1-x/g}}{\frac{(1-\alpha)C_0}{1-x/g}} = \frac{\alpha}{1-\alpha}\frac{x}{g} \quad (9)$$

As can be seen in the above equation, the output 112 is linearly dependent on the displacement, x, of the proof mass 130 and does not include any higher order polynomials like equation (4). In some embodiments, the scale factor of the amplification of the amplifier 120 is determined by the value α, e.g., the ratio of the total capacitance $C_0$ of the sense element 201 (e.g., the ratio of the area of the sense element 201 in comparison to the area of a first sense element 101 having an area equal to the area of a side of the proof mass 130). As α approaches 1, the amplification of the amplifier 120 approaches infinity. For example, if the area of the sense element 201 is 40% of the area of side of the proof mass 130, then α=0.4. The remaining percentage (e.g., 1−α) is the ratio of the area of the feedback element 202 in comparison to the area of the side of the proof mass 130. For example, where the sense element 201 is 40% of the area of the side of the proof mass 130, the remaining percentage, 0.6, is the ratio of the area of the feedback element 202 to the area of the proof mass 130.

By eliminating the second sense element 102 and providing a sense element 201 and feedback element 202 on a first side of the proof mass 130, the MEMS sensor 200 provides advantages over the MEMS sensor 100. The MEMS sensor 200 has a smaller profile and simpler structure, as sense elements are formed only on a single side of the proof mass 130. Eliminating the negative electrode (e.g., the second sense element 102) also provides extra space allowing for an increase in sensitivity of the MEMS sensor 200 compared to the MEMS sensor 100. MEMS sensor 100 is limited by a non-linear response and only allows displacement of the proof mass 130 of approximately 10% of the gap distance g. In contrast, the MEMS sensor 200 theoretically allows displacement of the proof mass 130 to 100% of the gap distance g, allowing greater sensitivity and larger sensing ranges for the MEMS sensor 200.

Using the capacitive detection scheme describe by equation (9) for a MEMS microphone may eliminate the total harmonic distortion, enabling the MEMS microphone to perform with improved quality at large sound levels. The embodiments described herein are advantageous over the prior art microphones because the prior art microphones use single sided sensing described by equation (1) and the $x^2$ term dominates the total harmonic distortion whereas the embodiments described herein eliminate the harmonic distortion and provide a superior quality and performance.

The MEMS sensor 200 can be configured as any suitable MEMS sensor for detecting one or more environmental stimuli. For example, in various embodiments, the MEMS sensor 200 is configured as a barometer, a magnetometer, an accelerometer, a gyroscope, a microphone, and/or any other suitable MEMS sensor. Although embodiments discussed herein having a single proof mass 130, it will be appreciated that the MEMS sensor 200 can include multiple proof masses, each having associated sense elements 201, feedback elements 202, and/or reference elements 203.

Figure 3:
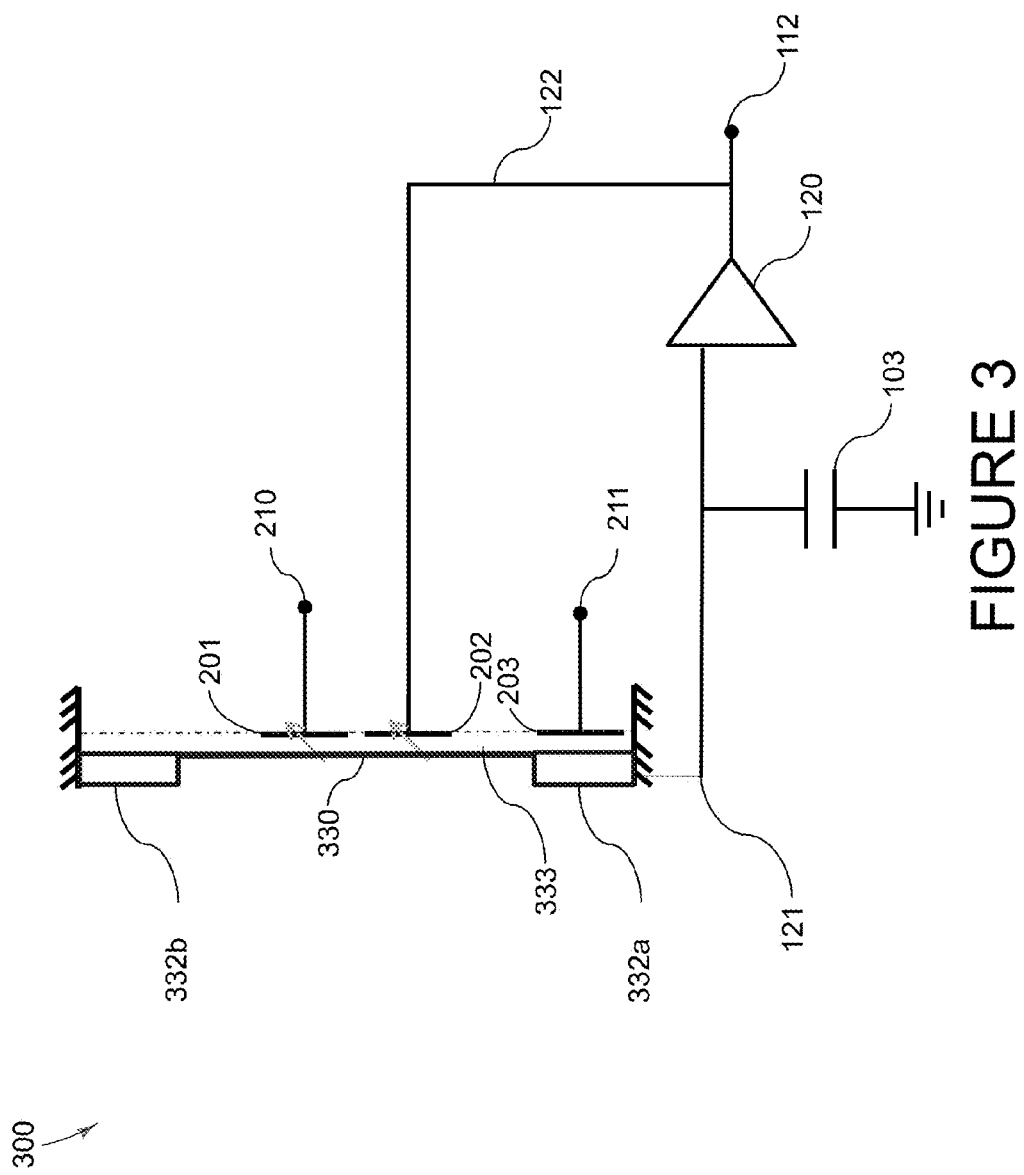
FIG. 3 shows a MEMS sensor with a membrane, in accordance with some embodiments.

FIG. 3 illustrates one embodiment of a MEMS sensor 300 having a linear proof mass 330. The linear proof mass 330 may be a MEMS mass. The linear proof mass 330 is coupled to a first anchor 332a and a second anchor 332b. In some embodiments, the proof mass 330 comprise a flexible membrane that is configured to deflect with respect to the sense element 201 and the feedback element 202. The flexible membrane can deflect into a cavity 333. In other embodiments, the proof mass 330 is a rigid linear element. The proof mass 330 is configured to move in response to ambient pressure and/or pressure changes. Movement of the proof mass 330 changes the capacitance of the sense element 201 and the feedback element 202. The sense element 201 is coupled to an input 210 and the feedback element 202 is coupled to the output 112 of the amplifier 120, as described above with respect to FIG. 2. The output 112 is generated similar to the output 112 discussed above with respect to FIG. 1, and similar description is not repeated herein. In some embodiments, the MEMS sensor 300 is configured as a barometer. In other embodiments, the MEMS sensor 300 is configured as a microphone.

Figure 4:
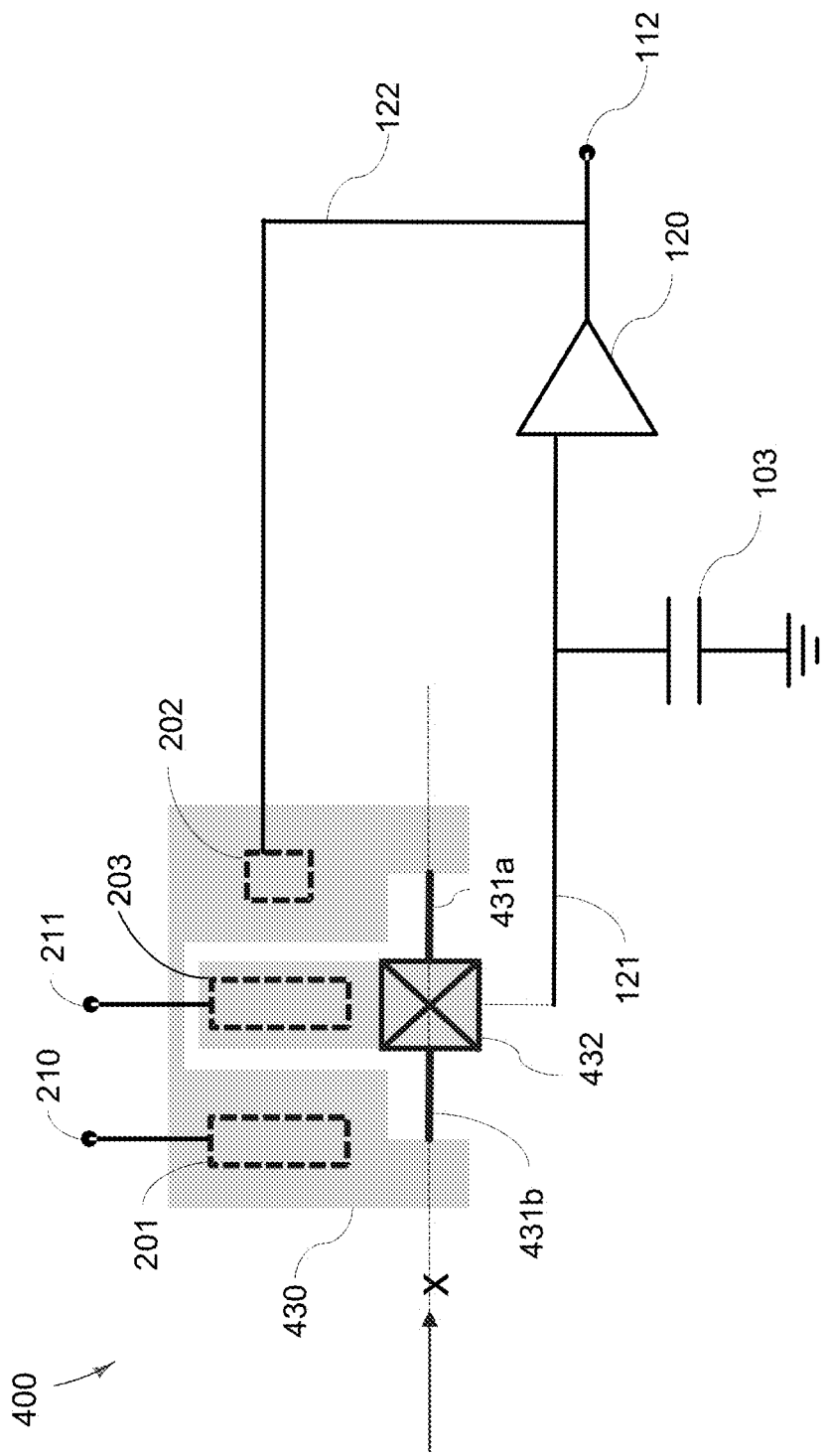
FIG. 4 shows a MEMS sensor with a rotating proof mass, in accordance with some embodiments.

FIG. 4 illustrates one embodiment of a MEMS sensor 400 having an out-of-plane rotational proof mass 430. The rotational proof mass 430 may be a MEMS mass. The rotational proof mass 430 is coupled to an anchor 432 by a first spring 431a and a second spring 431b. The rotational proof mass 430 rotates out-of-plane about the x axis around the center portion coupled directly to the anchor 432. In some embodiments, the sense element 201 and the feedback element 202 are coupled to a portion of the rotational proof mass 430. In other embodiments, the rotational proof mass 430 comprises a rotating electrode having a predetermined portion, a, configured as a sense element and a remaining portion (1−α) configured as a feedback element 202. The rotational proof mass 430 is configured to rotate out-of-plane of FIG. 4. Rotation of the rotational proof mass 430 causes a change in capacitance of the sense element 201 and the feedback element 202. The reference element 203 is positioned to apply a second input 211 to the anchor 432. The anchor 432 applies the second input 211 to the amplifier 120 via the wire 121. In some embodiments, the anchor 432 applies a composite signal generated by combining the proof mass signal and the second input 211.

Figure 5:
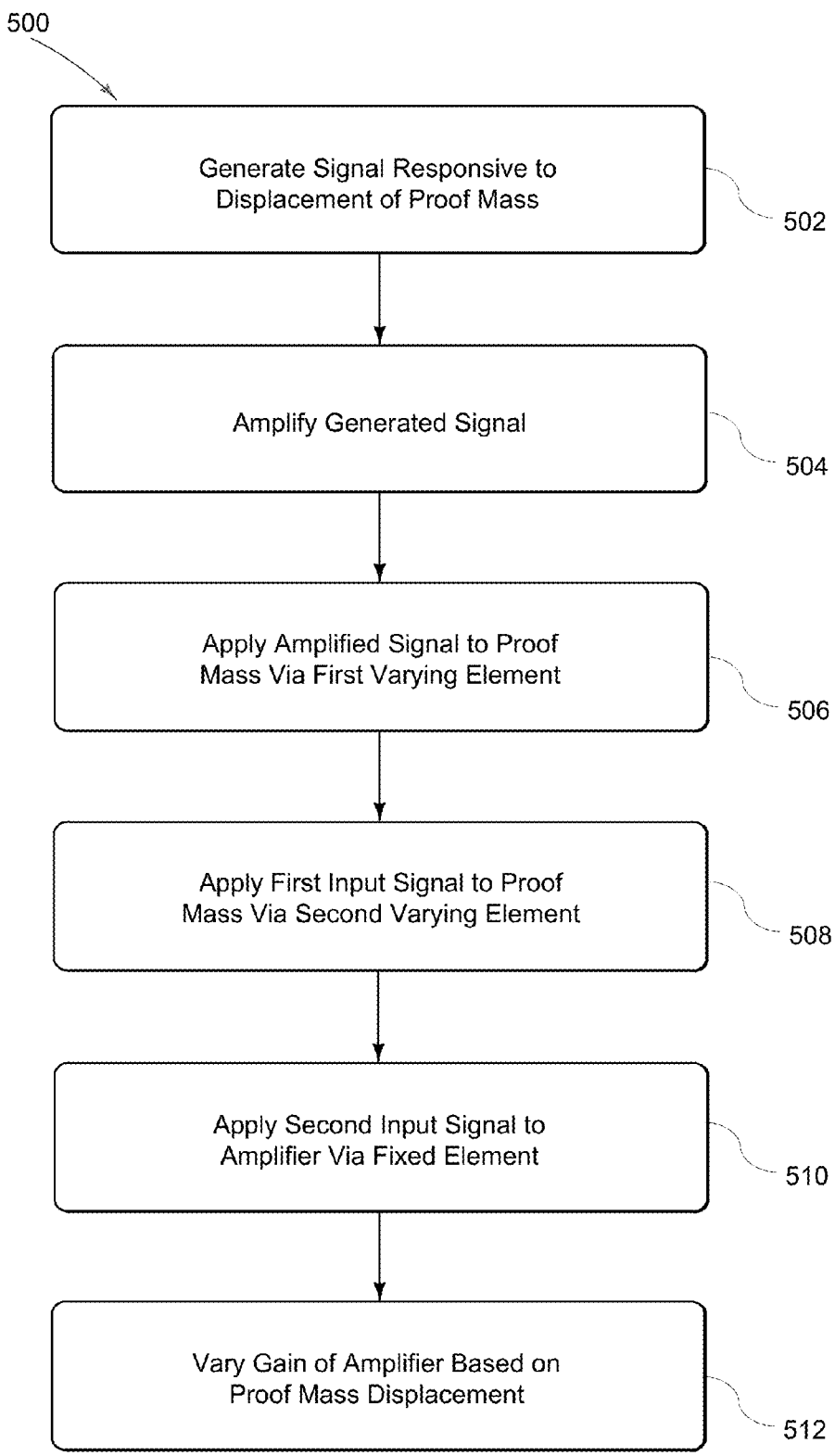
FIG. 5 shows a method of detecting an environmental condition, in accordance with some embodiments.

With reference to FIGS. 2-4, a method 500 of sensing one or more environmental factors is disclosed shown in FIG. 5. At 502, a signal, such as a proof mass signal, is generated in response to displacement of a proof mass 130. The proof mass 130 can be displaced by one or more environmental factors, such as, for example, acceleration, magnetic field, pressure, Coriolis force, acoustic pressure, piezoelectric force, electrostatic force, and/or any other suitable external stimuli or combination thereof. At step 504, the proof mass signal is amplified by an amplifier 120. The amplified proof mass signal is provided to a first varying element and applied back to the proof mass 130 at step 506. In some embodiments, the first varying element is a feedback element 202. The feedback element 202 can comprise any suitable varying element, such as, for example, a variable capacitor, a piezoelectric element, piezoresistive element, and/or any other suitable varying element. The feedback element 202 can be spaced apart from and/or integral with the proof mass 130. At step 508, a first input signal is applied to the proof mass 130 via a second varying element, such as the sense element 201. The sense element 201 can comprise any suitable varying element, such as, for example, a variable capacitor, a piezoelectric element, piezoresistive element, and/or any other suitable varying element. The sense element 201 can be spaced apart from and/or integral with the proof mass 130.

In some embodiments, a second input signal 211 is applied to the amplifier via a fixed element, such as a reference element 203 at step 510. The reference element 203 can be spaced apart from and/or coupled to an anchor 132. The gain of the amplifier 120 is varied based on the displacement of the proof mass 130 at step 512. The varying gain of the amplifier 120 effects the output 112 of the amplifier 120. The amplifier 120 produces a linear output in response to displacement of the proof mass 130. In some embodiments, the output 112 of the amplifier 120 and the variable gain is governed by equation (9) above.

Figure 6:
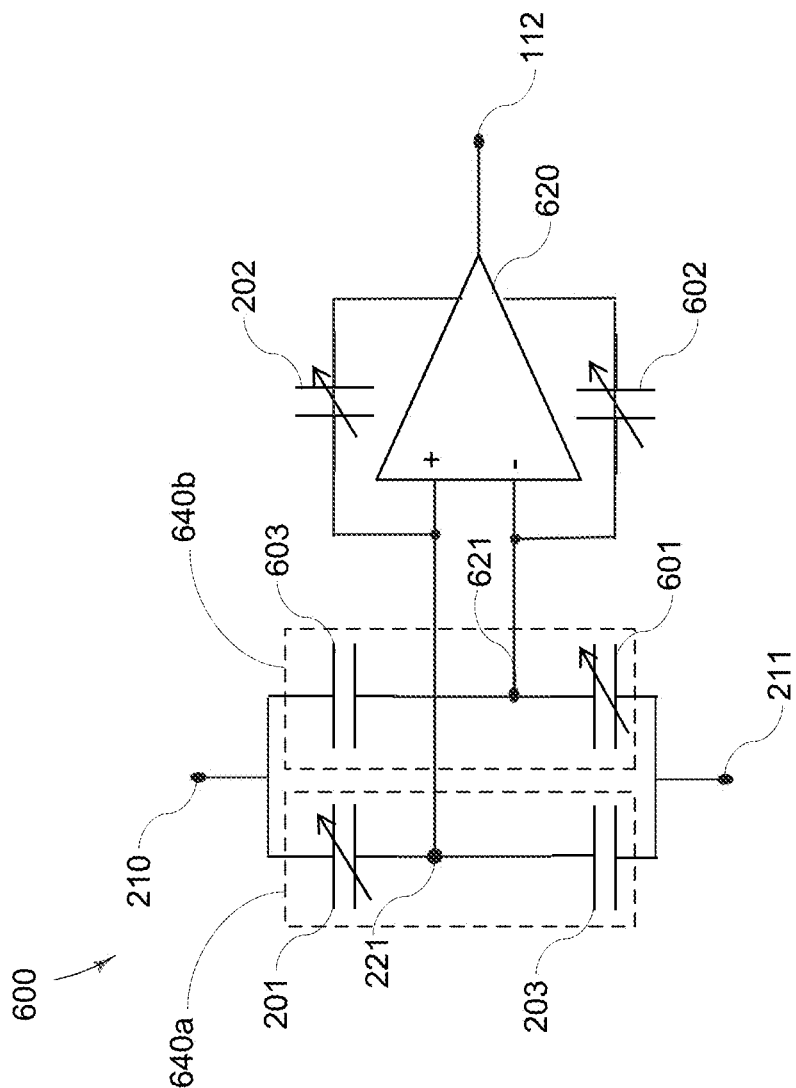
FIG. 6 shows a MEMS sensor with a full-Wheatstone bridge configuration, in accordance with some embodiments.

FIG. 6 illustrates one embodiment of a MEMS sensor 600 having a full-Wheatstone bridge configuration. The MEMS sensor 600 includes a first MEMS sensor 640a including a first sense element 201, a first feedback element 202, and a first reference element 203. The first sense element 201, first feedback element 202, and first reference element 203 operate as described in conjunction with FIGS. 2-4. A second MEMS sensor 640b is coupled in parallel with the first MEMS sensor 640a between the first input 210 and the second input 211. The second MEMS sensor 640b includes a second sense element 601, a second feedback element 602, and a second reference element 603. The second MEMS sensor 640b operates similar to the first MEMS sensor 640a, but provides an input to a negative terminal of an amplifier 620. The first MEMS sensor 640a and the second MEMS sensor 640b form a full-Wheatstone bridge configuration. In some embodiments, the amplifier 620 is an instrumentation amplifier. In some embodiments, the first MEMS sensor 640a and the second MEMS sensor 640b can use the same proof mass 130. In other embodiments, the first MEMS sensor 640a and the second MEMS sensor 640b can each include a proof mass 130.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear to persons having ordinary skill in the art to which the embodiments pertain, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A micro-electro-mechanical system comprising:
a proof mass configured to move in response to a stimulus;
an anchor coupled to the proof mass via a spring;
an amplifier configured to receive a proof mass signal from the proof mass via the spring and the anchor, wherein the amplifier is configured to amplify the received proof mass signal to generate an output signal;
a sense element connected between the proof mass and a first input signal;
a reference element connected between the anchor and a second input signal; and
a feedback element connected between the proof mass and the output signal, wherein the feedback element and the sense element change in response to proof mass displacement, and wherein the sense element and the feedback element are positioned on a same side of the proof mass, and wherein a gain of the amplifier is associated with a ratio of the feedback element and the sense element, and wherein the gain is non-linear, and wherein the received signal at the amplifier, from the anchor, is non-linear, and wherein the output signal is linear.

2. The micro-electro-mechanical system as described in claim 1, wherein a distance between the feedback element and the proof mass, and a distance between the sense element and the proof mass, change equally and in a same direction in response to proof mass displacement.

3. The micro-electro-mechanical system as described in claim 1, wherein a capacitance value of the sense element at substantially zero proof mass displacement and a capacitance value of reference element are substantially the same.

4. The micro-electro-mechanical system as described in claim 3, wherein a gain of the amplifier is set by a ratio of the sense element to the feedback element.

5. The micro-electro-mechanical system as described in claim 1, wherein the second input signal is opposite to the first input signal.

6. The micro-electro-mechanical system as described in claim 1, wherein the stimulus is selected from a group consisting of acceleration, pressure, Coriolis force, acoustic pressure, barometric pressure, piezoelectric force, and electrostatic force.

7. The micro-electro-mechanical system as described in claim 1, wherein the reference element, the feedback element, and the sense element are piezoresistors.

8. The micro-electro-mechanical system as described in claim 1, wherein the reference element, the feedback element, and the sense element are capacitors.

9. The micro-electro-mechanical system as described in claim 1, further comprising
a second proof mass configured to move in response to the stimulus;
a second anchor coupled to the second proof mass via a second spring;
the amplifier configured to further receive a second proof mass signal from the second proof mass via the second spring and the second anchor, wherein the amplifier is configured to amplify the received proof mass signal and second proof mass signal to generate the output signal;
a second sense element connected between the second proof mass and the second input signal;
a second reference element connected between the second anchor and the first input signal; and a second feedback element connected between the second proof mass and the output signal, wherein the second feedback element and the second sense element change in response to second proof mass displacement.

10. A method comprising:
applying a first input signal to a proof mass via a second varying element;
generating a signal responsive to the proof mass displacement;
amplifying the generated signal via an amplifier;
applying the amplified signal back to the proof mass via a first varying element;
applying a second input signal to the amplifier via a fixed element; and
varying a gain of the amplifier based on the proof mass displacement,
wherein a distance between the first varying element of the proof mass and a distance between the second varying element of the proof mass change equally and in a same direction responsive to displacement of the mass.

11. The method as described by claim 10, wherein the signal is generated responsive to a stimulus selected from a group consisting of acceleration, pressure, Coriolis force, acoustic pressure, barometric pressure, piezoelectric force, and electrostatic force.

12. The method as described by claim 10, wherein the first and second varying elements are piezoresistors.

13. The method as described by claim 10, wherein the first and second varying elements are variable capacitors.

14. The method as described by claim 10, wherein the gain is non-linear and wherein the generated signal received by the amplifier is non-linear and wherein the amplified signal is linear.

15. A device comprising:
a micro-electro-mechanical system (MEMS) device configured to generate an output signal responsive to a stimulus, wherein the output signal is generated in response to a displacement associated with a component within the MEMS device;
a first capacitor configured to change its capacitance responsive to the displacement associated with the component within the MEMS device;
a second capacitor configured to receive a second capacitor input signal and wherein the second capacitor is configured to change its capacitance response to the displacement associated with the component within the MEMS device, wherein the first capacitor and the second capacitor are positioned on a same side of the MEMS device;
a third capacitor coupled to the MEMS device and an input signal wherein the input signal of the third capacitor has a polarity different from the second capacitor input signal; and
an amplifier configured to receive the input signal via the MEMS device, wherein the amplifier is configured to amplify the input signal to generate the output signal, and wherein the first capacitor is connected to the output of the amplifier and further connected to the MEMS device,
wherein a gain of the amplifier is based on a ratio of the first capacitor and the second capacitor, and wherein the gain is non-linear and wherein the input signal at the amplifier is non-linear and wherein the output signal is linear.

16. The device as described in claim 15, wherein the capacitance of the first capacitor and the capacitance of the second capacitor change equally and in a same direction responsive to the displacement associated with the component within the MEMS device.

17. The device as described in claim 15, wherein the stimulus is selected from a group consisting of acceleration, pressure, Coriolis force, acoustic pressure, barometric pressure, piezoelectric force, and electrostatic force.

18. The device as described in claim 15, wherein the MEMS device is a rotational MEMS.

19. The device as described in claim 15, wherein the MEMS device is selected from a group consisting of a barometer, accelerometer, magnetometer, gyroscope and microphone.

* * * * *